Feb. 9, 1960 A. OWENS 2,924,079
REVERSIBLE CYCLE REFRIGERATION SYSTEM
Filed June 9, 1958 2 Sheets-Sheet 1

*INVENTOR.*
ALAN OWENS
BY *Cohn and Powell*

ATTORNEYS

Feb. 9, 1960 A. OWENS 2,924,079
REVERSIBLE CYCLE REFRIGERATION SYSTEM
Filed June 9, 1958 2 Sheets-Sheet 2

*INVENTOR.*
ALAN OWENS
BY *Cohn and Powell*
ATTORNEYS

United States Patent Office 2,924,079
Patented Feb. 9, 1960

2,924,079

REVERSIBLE CYCLE REFRIGERATION SYSTEM

Alan Owens, Falls Church, Va., assignor to Sporlan Valve Company, Inc., St. Louis, Mo., a corporation of Missouri Application June 9, 1958, Serial No. 740,802

17 Claims. (Cl. 62—160)

This invention relates generally to improvements in a reversible cycle refrigeration system, and more particularly to improved controls utilized in regulating refrigerant flow into the evaporator of the system during the heating cycle.

By reversing the refrigerant flow through part or all of such a system, a heat transfer surface can be used either to condense or to evaporate the refrigerant, and hence a heat transfer coil suitably located and mounted in the space to be conditioned can selectively supply or remove heat.

It is an important object to utilize thermostatic expansion valves as a control mechanism for regulating refrigerant feed to the outdoor coil of a reversible cycle refrigeration system.

Some of the problems found in the application of thermostatic expansion valves to heat pumps arise from the characteristic reversibility of the refrigerant flow. The sensing bulb of the thermostatic expansion valve, while it is required to operate only at relatively moderate ambient temperature, may be subjected at times to compressor discharge temperatures which are often as high as 350 degrees F. Unless thermostatic elements which operate on the cross-ambient vapor-pressure principle are protected against the excessive pressures developed at the elevated temperatures, damage to the operating flexible motor element such as a diaphragm or serious impairment of its useful life will occur.

A conventional means for limiting pressure in the motor unit of the expansion valve is to employ a limited-vapor or so-called "gas charge." This type of charge can be used if the diaphragm housing temperature is sufficiently elevated above that of the sensing bulb so that the entire liquid phase of the charge remains in the bulb.

For the indoor coil of a reversible cycle refrigeration system, a "gas charge" motor unit operates quite successfully during the coiling cycle. Normal ambient temperatures during the cooling cycle are around 75 degrees F. with evaporating temperatures between 30 and 40 degrees F. It is not difficult to maintain the diaphragm housing temperature above that of the bulb, and hence condensation of the refrigerant charge in the diaphragm case is easily avoided.

Moreover, since "gas charged" thermostatic motor units are designed to achieve complete vaporization at 55 or 60 degrees F., bulb temperatures exceeding this vaporization temperature will cause only a slight increase in pressure in the motor unit since the charge then behaves according to the gas laws rather than as saturated vapor. Thus it is seen that excessive motor unit pressures do not occur during the heating cycle when the indoor coil serves as the condenser.

The outdoor coil, used as the condenser during the cooling cycle, presents a different problem. Condensing pressures and temperatures are usually somewhat higher during the cooling cycle which makes it even more desirable to have some kind of pressure limiting means available for the thermostatic motor unit. However, the limited-vapor or "gas charge" cannot be utilized because during the heating cycle, when the outdoor coil serves as the evaporator, ambient temperatures at the thermostatic expansion valve become quite low and condensation of charge from the bulb into the diaphragm case is a serious problem. When charge condensation occurs, the effect is for valve control to be lost from the bulb and assumed by the lower temperature diaphragm case. Thus the valve will throttle and the evaporator will be starved of refrigerant. Since the heat rejection of the condenser (indoor coil during the heating cycle) is directly related to rate of evaporation in the outdoor coil, the resultant effect of starving is to reduce the net output of the equipment during the heating cycle.

An important object of this invenion is to provide means for limiting the thermostatic motor unit pressure in which charge condensation problems are not incurred.

Another important object is achieved by improved means that provide protection against excessive pressures while operating entirely on the saturated-vapor principle.

These functional advantages and results are accomplished by an improved motor unit for the thermostatic expansion valve, such motor unit utilizing two bulbs that are interconnected by tubing to one side of the flexible motor element. One bulb is installed in thermal sensing relation on the refrigerant line the temperature of which is to be regulated during normal operation of the thermostatic expansion valve. The other bulb is placed in thermal sensing relation on a line which is relatively cooler than the location of the first bulb while the valve is inoperative and the first refrigerant line is hot, as it would be when discharge vapor from the compressor passes through it. Under the conditions, the charge in the motor unit will migrate to the cooler bulb and excessive thermostatic motor unit pressure will be avoided.

Another important objective is achieved by making the thermostatic motor unit of the expansion valve of simple, durable construction, and by providing a control means in the reversible cycle refrigeration system that is efficient in operation.

The foregoing and numerous other objects and advantages of the invention will more clearly appear from the following detailed description of a preferred embodiment, and one modification thereof, particularly when considered in connection with the accompanying drawings, in which.

Figure 1:
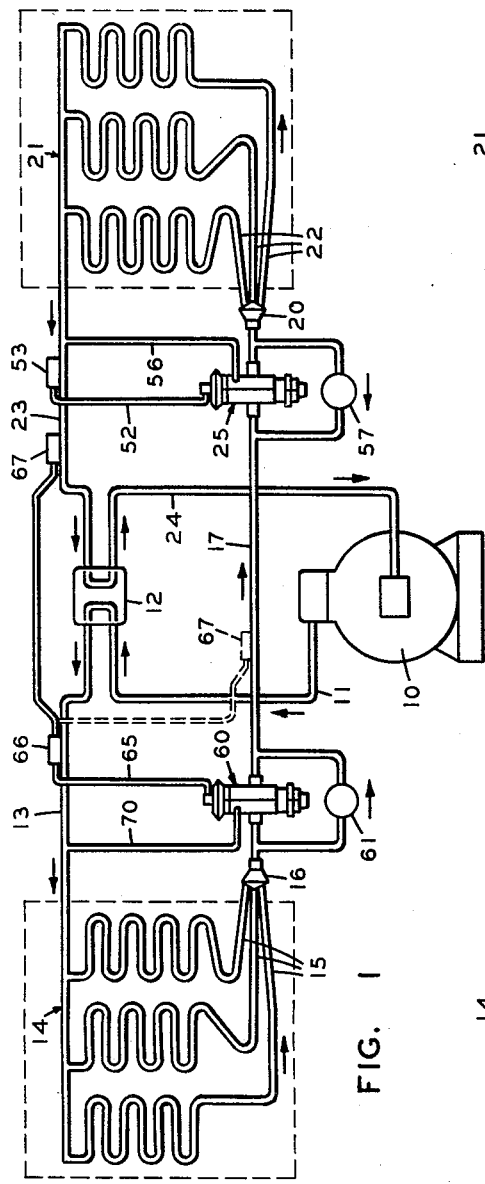
Fig. 1 is a diagrammatic view of the refrigerant system representing the cooling cycle, the direction of flow being indicated by arrows adjacent to the refrigerant lines.
Figure 2:
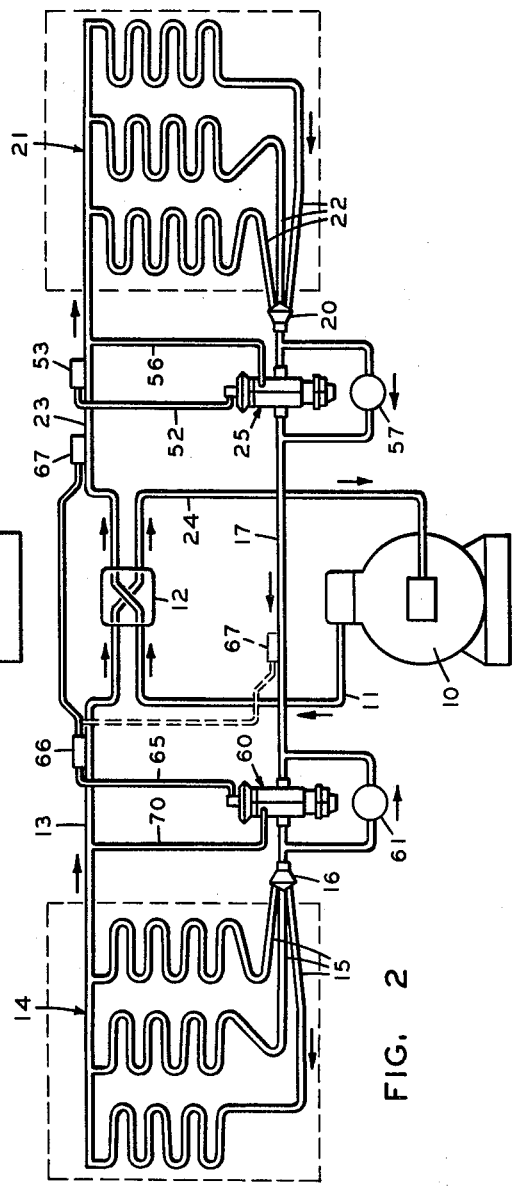
Fig. 2 is a diagrammatic view of the same refrigerant system of Fig. 1 with the cycle reversed for heating.

Referring first to Figs. 1 and 2, the refrigeration system includes a compressor 10 having a discharge line 11 leading and connected to a four-way valve 12 or some equivalent device. As is shown in Fig. 1 during the cooling cycle, the discharge line 11 is connected by valve 12 to a refrigerant line 13 connected to the inlet of outdoor coil 14. The outdoor coil 14, serving as a condenser during the cooling cycle, consists of a plurality of branches 15 leading to a distributor 16 at the outlet of the outdoor coil 14.

The liquid refrigerant line 17 interconnects the distributor 16 of the outdoor coil 14 with a distributor 20 at one side of the indoor coil 21. The indoor coil 21 consists of a plurality of feed lines 22 connected together at the opposite side of the indoor coil. A refrigerant line 23 connected to the side of the indoor coil considered the outlet during the cooling cycle, is connected through the valve 12 to the suction line 24, and hence back to the compressor 10.

Figure 5:
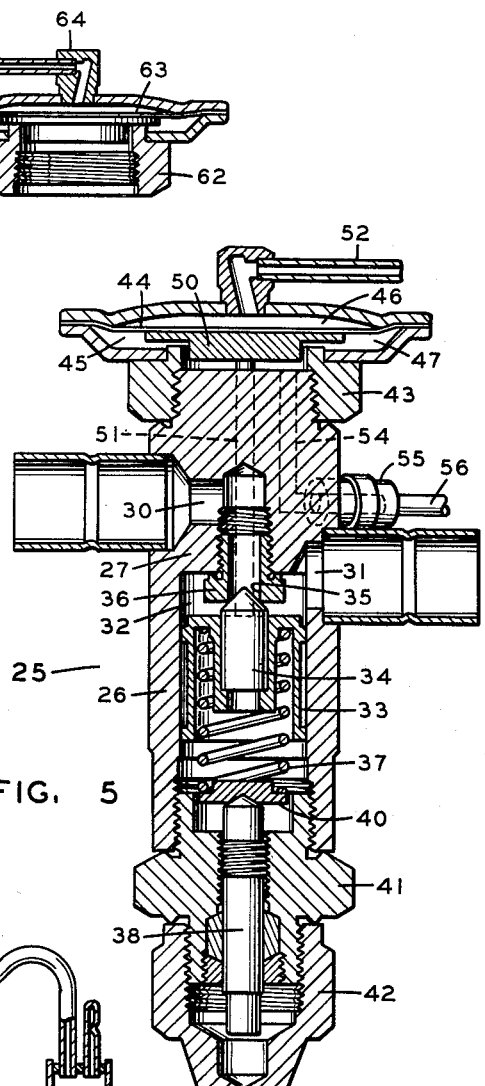
Fig. 5 is a cross sectional view of a typical thermostatic expansion valve.

An indoor thermostatic expansion valve 25 is operatively connected in the liquid line 17 adjacent the indoor coil 21, the structure of the expansion device being best shown in Fig. 5.

For completeness of disclosure, the structure and operation of the expansion valve will be briefly described, the valve being a unit of this type sold by Sporlan Valve Company of St. Louis, Missouri.

The thermostatic expansion valve 25 includes a body 26 forming an enclosure which is in the nature of a housing, casing or barrel. A partition 27 separates a passageway formed through body 26 to provide an inlet 30 and an outlet 31. Located below partition 27 is an outlet chamber 32 which communicates with outlet 31. Located and reciprocally movable within outlet chamber 32 is a valve guide 33 that constitutes a carriage for carrying a valve 34 operable to open and close a valve port 35. Valve port 35 is formed in a replaceable threaded element 36 fastened and located in partition 27. The valve 34 and valve seat port 35 cooperate to control the flow of refrigerant between inlet 30 and outlet 31.

A compression spring 37 is located in outlet chamber 32, and is arranged to engage guide 33 so that the spring 37 acting through guide 33 tends to urge valve 34 toward a closed position.

The compressive force of spring 37 may be selectively adjusted by the manipulation of threaded stem 38, one end of which engages a movable plate 40 forming an abutment for the lower end of spring 37. Stem 38 is threadedly carried by collar 41 fastened to body 26. A cap 42 is threadedly connected to the lower end of collar 41 and serves to enclose the lower end of stem 38.

The motor unit for the expansion valve includes a casing structure 43 attached to the upper end of body 26 and a diaphragm 44 constituting a flexible motor element located in a diaphragm chamber generally indicated at 45. The diaphragm 44 divides chamber 45 into separate compartments 46 and 47. As a reenforcing or backing for diaphragm 44 there is employed a follower plate 50. Motion of the diaphragm 44 and follower plate 50 is imparted to guide 33, and hence to valve 24 through a plurality of push rods, only one of which is shown and indicated at 51 in dotted lines.

The motor unit of thermostatic expansion valve 25 includes a tubing 52 communicating with one side of the diaphragm 44. A bulb 53 is connected in the tubing 52 and is located in thermal-responsive relation to the refrigerant line 23 considered the outlet of indoor coil 21 during the cooling cycle. A limited fluid charge is introduced into bulb 53, and consists preferably of a fluid having characteristics approaching or identical with those of the refrigerant employed in the system, and will usually consist of Freon 12, Freon 22, methylchloride or any other of the refrigerants selected for the system according to preference and field of usage. Below a predetermined temperature at the bulb 53, the charge is partly in liquid phase and partly in vapor phase, and above this temperature all of the charge is in a vapor phase.

The diaphragm 44 is capable of flexing action under the influence of fluid pressure changes occurring by reason of the thermal effects imparted to bulb 53 in response to changes in superheat in the suction line 23 during the cooling cycle.

The indoor thermostatic expansion valve 25 includes a portion of a so-called equalizer passage. The equalizer passage includes a bore 54 extending into chamber 47 below diaphragm 44, the bore 54 being continued outwardly of the body of the valve and connected by fitting 55 to tubing 56 communicating with the refrigerant line 23 considered the outlet of indoor coil 21 during the cooling cycle. It will thus appear that the chamber 47 is subject at all times to pressure conditions existing at the refrigerant line 23 considered the outlet of indoor coil 21 during the cooling cycle, which pressure tends to act in conjunction with spring 36 to bias valve 34 toward a closed position against its seat 35.

Connected in the liquid line 17 and connected across the inlet 30 and outlet 31 of the indoor expansion valve 25, is a check valve 57 that causes refrigerant flow through the expansion valve 25 during the cooling cycle and causes the flow to by-pass the expansion valve 25 during the heating cycle.

A similar thermostatic expansion valve 60 is connected in the liquid line 17 at the side of the outdoor coil considered the outlet during the cooling cycle. A check valve 61 is connected in the liquid line 17 and across the inlet and outlet of expansion valve 60, the check valve 61 permitting refrigerant flow through the outdoor expansion valve 60 only during the heating cycle and causing the refrigerant flow to by-pass the outdoor expansion valve 60 during the cooling cycle.

Figure 3:
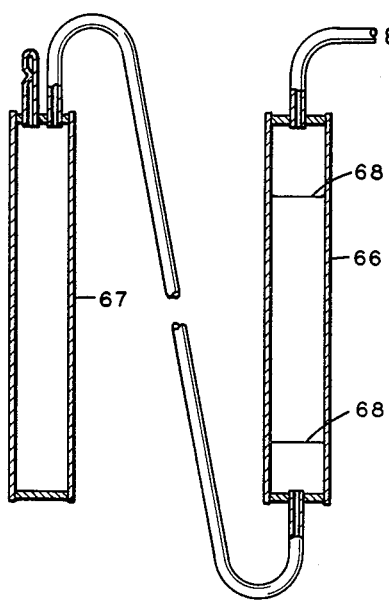
Fig. 3 is a cross sectional view of the motor unit of the outdoor thermostatic expansion valve.

The motor unit for the outdoor thermostatic expansion valve 60 is best shown in Fig. 3. For example, the valve body 26 is attached to a diaphragm casing 62 in which diaphragm 63 is located, the diaphragm 63 constituting a flexible motor element. Connected to casing 62 by fitting 64 is a tubing 65 communicating with one side of diaphragm 63. Located in tubing 65 is a pair of thermal-sensing bulbs 66 and 67. The motor unit formed by the compartment at one side of diaphragm 63, tubing 65 and bulbs 66—67 is provided with a vapor-pressure type thermostatic charge preferably having characteristics approaching or identical with those of the refrigerant used in the system. Because the bulbs 66—67 are interconnected by the tubing 65, the conventional cross-ambient charge can migrate freely to either bulb.

As will be explained more fully in subsequent description of parts and operation, the valve action is controlled by the cooler bulb and the amount of charge is so established that a liquid-vapor interface as indicated at 68 exists in the bulb irrespective of whether the diaphragm case 62 is colder or warmer than the sensing bulb.

An equalizer connection 70 is connected to the refrigerant line 13 constituting the inlet of outdoor coil 14 during the cooling cycle and operatively communicates with the opposite side of diaphragm 63 of the outdoor expansion valve 60.

When assembled in the refrigerant system, the thermal-sensing bulb 66 is placed in thermal-sensing relation to the refrigerant line 13 adjacent one side of the outdoor coil 14, the refrigerant line 13 being considered the inlet to coil 14 during the cooling cycle. The sensing bulb 67 is placed in thermal sensing relation to a portion of the system that is cooler than the location of bulb 66 during the cooling cycle, yet warmer than the location of bulb 66 during the heating cycle. More particularly, the sensing bulb 67 is placed in thermal sensing relation to the refrigerant line 23 adjacent one side of the indoor coil 21, the refrigerant line 23 being considered the outlet of indoor coil 21 during the cooling cycle.

As an alternative, the sensing bulb 67 can be placed in thermal sensing relation to the liquid line 17, and particularly at the side of expansion valve 60 considered the inlet during the heating cycle. This alternate position is shown by dashed lines in Figs. 1 and 2.

Figure 4:
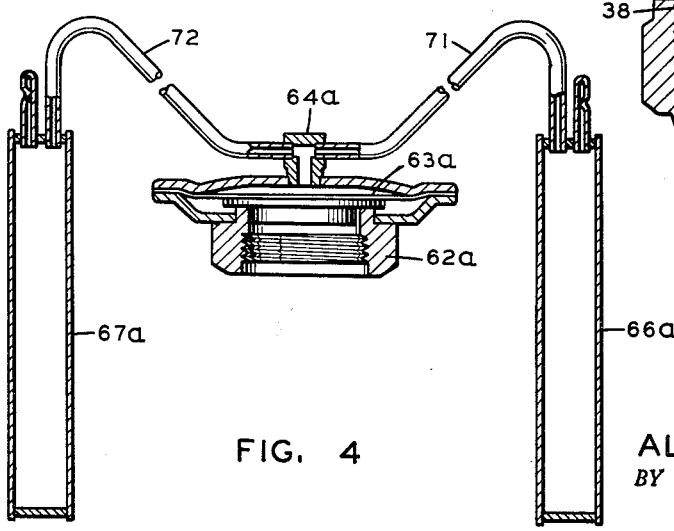
Fig. 4 is a cross sectional view of an equivalent modified structure of the motor unit disclosed above in Fig. 3.

Fig. 4 discloses an alternate arrangement of the motor unit utilized in outdoor thermostatic expansion valve 60. Similar to the motor unit disclosed previously in Fig. 3, this modified arrangement includes a valve body 26 to which is attached a diaphragm casing 62a. Held within casing 62a is a diaphragm 63a that constitutes a flexible motor element. A fitting 64a connects a pair of tubes 71 and 72 to the diaphragm casing 62a, and places the tubing in communication with one side of the diaphragm 63a. Connected in the capillary tubing 71 is a thermal sensing bulb 66a corresponding to the bulb 66 disclosed in Fig. 3. Similarly, connected in the capillary tubing 72 is a thermal sensing bulb 67a that corresponds to the bulb 67 previously described in the motor unit shown in Fig. 3.

It will be noted that in each of the modified arrangements of motor units disclosed in Figs. 3 and 4, a pair of sensing bulbs 66—67 or 66a—67a is connected by tubing and placed in communication with one side of diaphragm 63 or 63a respectively. In Fig. 3 the bulbs are connected in series in a line of capillary tubing. In Fig. 4 the bulbs are connected by separate capillary tubing to the diaphragm casing. One arrangement is the equivalent structurally and functionally of the other arrangement.

When assembled in the refrigerant system, the bulbs 66a and 67a of the motor unit disclosed in Fig. 4 are assembled in thermal-sensing relation to the parts of the system as described fully above with respect to bulbs 66 and 67 of the motor unit disclosed in Fig. 3.

The operation and functional advantages of the reversible cycle refrigerant system or heat pump is now described for completeness of disclosure. Assume first that the system is conditioned for the cooling cycle.

Referring to Fig. 1, it is seen that the hot discharge gas flows from the compressor 10 through line 11, through the four-way valve 12 or other equivalent flow-diverting device, and through outdoor coil 14, where the gas is cooled by air passing over the coil, until it is condensed to a liquid having a relatively high pressure. After the refrigerant leaves the outdoor coil 14 through distributor 16, it is diverted through the one-way check valve 61 which permits flow only in the direction of the arrow, then around the outdoor thermostatic expansion valve 60 to the liquid line 17. The by-pass flow through the check valve 61 is usually necessary because the expansion valve 60 is inoperative during the cooling cycle and the high pressure present at the valve outlet or at equalizer connection 70 is sufficient to keep the expansion valve 60 closed, thus preventing flow through it.

The condensed refrigerant flows through liquid line 17 to the inlet of indoor expansion valve 25. Throttling of the liquid refrigerant in the expansion valve 25 reduces its pressure, permitting it to boil off as it passes through the distributor 20 and the indoor coil 21. The sensing bulb 53 at the outlet of indoor coil 21 controls the rate of refrigerant feed in the conventional manner of a thermostatic expansion valve, maintaining a superheated vapor condition for the outlet of the indoor coil 21. The superheated vapor returns through the refrigerant line 23 by way of the four-way valve 12, through the suction line 24 to the intake of the compressor 10. Here the refrigerant is compressed substantially adiabatically to a high pressure and the cycle is complete.

Typical refrigerant pressures and temperatures for the cooling cycle, using monochlorodifluoromethane (Freon-22) as the refrigerant are as follows:

|  | Temperature, ° F. | Pressure, p.s.i.g. |
| --- | --- | --- |
| Compressor discharge vapor | 250 | 360 |
| Condenser (saturated) | 145 | 360 |
| Liquid line | 115 | 360 |
| Evaporator (indoor coil) | 40 | 70 |
| Suction line | 50-60 | 70 |

Pressures and temperatures are influenced by varying load conditions, so that inside and outside ambient temperatures may vary somewhat the values given above. Friction losses through piping and other pressure losses are not included.

During the cooling cycle, the indoor thermostatic expansion valve 25 feeding the indoor coil 21 functions normally. Ambient temperatures at the valve are around 75 degrees F. and normal suction temperatures are approximately 40 degrees to 50 degrees F. Because the bulb 53 is approximately 25 to 35 degrees cooler than the diaphragm case (less any cooling effect by conduction to the refrigerant through the valve body) a limited-vapor or "gas charge" is satisfactory and charge condensation is not a problem. It is common practice to employ the "gas-charge" motor unit on an indoor coil of a heat pump, just as for most comfort cooling systems.

The thermostatic expansion valve 60, connected to the outdoor coil 14, is inoperative and the motor unit must be protected against over pressure since its sensing bulb 66 is subjected to discharge gas temperature. At the tabulated discharge temperature of 250 degrees F., a conventional Freon-22 vapor-pressure type thermostatic charge will have reached its critical pressure of approximately 700 p.s.i.g.

The protection against excessive pressure is accomplished by the provision of a second sensing bulb 67 operatively interconnected to the first sensing bulb 66 and to the diaphragm 63 of the outdoor expansion valve by capillary tubing, as described previously.

During the cooling cycle, the outdoor expansion valve 60 is inoperative and since the suction vapor leaving the indoor coil 21 is cooler than the discharge vapor entering the outdoor coil 14 (tabulated at 50-60 degrees F. and 250 degrees F. respectively) the element charge from both the diaphragm case 62 and the sensing bulb 66 of thermostatic expansion valve 60 will condense in bulb 67 and the charge pressure will be limited to the saturated pressure corresponding to the suction vapor temperature, approximately 85 to 105 p.s.i.g.

As discussed previously, an alternate location for sensing bulb 67 would be at any part of the system which would be cooler than the discharge line 13, and the element pressure would then be limited to the saturated pressure of the element charge corresponding to the bulb temperature which prevails. However in choosing alternate locations, one must be selected which will always be warmer than the sensing bulb 66 for that part of the cycle during which the outdoor expansion valve 60 is operative. In the alternative position shown in dashed lines in Fig. 1, the second bulb 67 is located on the liquid line 17, the typical temperature of which is approximately 115 degrees F., and which would limit a Freon-22 element charge to approximately 250 p.s.i.g.

The double bulb arrangements might be obviated by installing a single bulb on the common suction line 24, down stream from the four-way valve 12. However this has frequently been found in practice to be undesirable, since transfer from hot discharge vapor to the cooler suction vapor, in their passage through the four-way valve 12, has a varying and unpredictable value, thereby affecting the capacity of the outdoor coil 14 during the heating cycle.

The refrigerant path is substantially reversed during the heating cycle as is shown in Fig. 2. The discharge vapor flows from the compressor 10 through line 11 and four-way valve 12 to the indoor coil 21, where the refrigerant is cooled and condensed by the movement of the air across the indoor coil. Air moving across the indoor coil 21 absorbs the heat rejected in condensing the refrigerant and is circulated through the space to be heated.

After the condensed refrigerant, still at high pressure, leaves the indoor coil 21 through distributor 20, the refrigerant is diverted around the indoor expansion valve 25 through a by-pass line having the one-way check valve 57, the check valve 57 permitting flow only as shown by the arrow. The by-pass arrangement is necessary since the gas-charged indoor expansion valve 25 is closed because of the high pressure at its normal outlet or at the equalizer connection 56. The refrigerant flow continues through liquid line 17, through the outdoor expansion valve 60 and through the distributor 16 and the outdoor coil 14. Check valve 61 prevents bypassing of the outdoor expansion valve 60. Throttling of the refrigerant flow through the outdoor expansion valve 60 to a lower pressure results in evaporation and the absorption of heat from air passing over the outdoor coil 14.

The rate of feed through the outdoor expansion valve 60 is controlled by the thermal sensing bulb 66 so that the refrigerant vapor at the outdoor coil exit is superheated. The superheated vapor returns to the compressor suction intake by way of refrigerant line 13 through the four-way valve 12 and the suction line 24.

Because the second bulb 67 is on the hot line leading to the indoor coil 21, there is no interference with the control at sensing bulb 66 on the cooler suction line. Likewise, with the second bulb 67 at its alternate position on the liquid line 17, control is still at the suction line since its temperature is considerably lower than that of the liquid line 17.

Pressures and temperatures for the heating cycle of a heat pump vary considerably more than they do on the cooling cycle. The following tabulation might be considered fairly typical for a Freon-22 system with an outside ambient temperature of 32 degrees F.

|  | Temperature, °F. | Pressure, p.s.i.g. |
| --- | --- | --- |
| Compressor discharge vapor | 200 | 230 |
| Condenser (saturated) | 110 | 230 |
| Liquid line | 90 | 230 |
| Evaporator (outdoor coil) | 15 | 38 |
| Suction line | 25 | 38 |

Although the invention has been described by making detailed reference to a preferred embodiment, and equivalent modifications, such detail is to be understood in an instructive, rather than in any restrictive sense, many variants being possible within the scope of the claims hereunto appended.

I claim as my invention:

1. In a reversible cycle refrigeration system of indoor coil-outdoor coil-compressor type, a thermostatic expansion valve connected in the refrigerant line considered the inlet to the outdoor coil during the heating cycle, the thermostatic expansion valve including a motor unit including a flexible motor element, tubing communicating with one side of said motor element, and a plurality of thermal-sensing bulbs connected to said tubing, a liquid-vapor charge in the motor unit, one of said bulbs being placed in thermal sensing relation to the refrigerant line considered the outlet of the outdoor coil during the heating cycle, and a second bulb placed in thermal sensing relation to a portion of the system that is cooler than the location of said first bulb during the cooling cycle yet warmer than the said first bulb location during the heating cycle.

2. The combination and arrangement of elements as recited above in claim 1, but further characterized in that the said second bulb is placed in thermal sensing relation to the refrigerant line to the indoor coil considered the inlet during the heating cycle.

3. The combination and arrangement of elements as recited above in claim 1, but further characterized in that the said second bulb is placed in thermal sensing relation to the liquid refrigerant line.

4. The combination and arrangement of elements as recited above in claim 1, but further characterized by the provision of a check valve connected across the inlet and outlet of said thermostatic expansion valve, the check valve permitting refrigerant flow to by-pass the thermostatic expansion valve only during the cooling cycle.

5. In a reversible cycle refrigeration system of indoor coil-outdoor coil-compressor type, an indoor thermostatic expansion valve connected in the refrigerant line of the indoor coil considered the outlet during the heating cycle, the indoor thermostatic expansion valve including a motor unit including a flexible motor element, tubing communicating with one side of said flexible motor element, and a thermal-sensing bulb connected to said tubing and placed in thermal-sensing relation to the refrigerant line of the indoor coil considered the inlet during the heating cycle, a limited-vapor charge in said motor unit; an outdoor thermostatic expansion valve connected in the refrigerant line of the outdoor coil considered the inlet during the heating cycle, the outdoor thermostatic expansion valve including a motor unit including a flexible motor element, tubing communicating with one side of the flexible motor element, and a plurality of thermal sensing bulbs connected to said tubing, a liquid-vapor charge in said motor unit, a first bulb of the outdoor thermostatic valve being placed in thermal sensing relation to the refrigerant line of the outdoor coil considered the outlet during the heating cycle, and a second bulb being placed in thermal sensing relation to a portion of the system that is cooler than the location of the first bulb of the outdoor thermostatic expansion valve during the cooling cycle yet warmer than the said first bulb location during the heating cycle.

6. The combination and arrangement of elements as recited above in claim 5, but further characterized in that the said second bulb of said outdoor thermostatic expansion valve is placed in thermal sensing relation to the refrigerant line to the indoor coil considered the inlet during the heating cycle.

7. The combination and arrangement of elements as recited above in claim 5, but further characterized in that the said second bulb of said outdoor thermostatic expansion valve is placed in thermal sensing relation to the liquid refrigerant line.

8. The combination and arrangement of elements as recited above in claim 5, but further characterized by the provision of a check valve connected across each of said thermostatic expansion valves, the check valve across the said indoor thermostatic expansion valve permitting refrigerant flow to by-pass the said indoor thermostatic expansion valve only during the heating cycle, the check valve across the said outdoor thermostatic expansion valve permitting refrigerant flow to by-pass the said outdoor thermostatic expansion valve only during the cooling cycle.

9. In a reversible cycle refrigeration system of indoor coil-outdoor coil-compressor type, an indoor thermostatic expansion valve connected in the refrigerant line of the indoor coil considered the outlet during the heating cycle, the indoor thermostatic expansion valve including a motor unit having a flexible motor element, tubing communicating with one side of said flexible motor element, and a thermal sensing bulb connected to said tubing and placed in thermal-sensing relation to the refrigerant line of the indoor coil considered the outlet during the heating cycle, a limited-vapor charge in said motor unit; an outdoor thermostatic expansion valve connected in the refrigerant line of the outdoor coil considered the inlet during the heating cycle, the outdoor thermostatic expansion valve including a motor unit having a flexible motor element, tubing communicating with one side of the flexible motor element, and a plurality of thermal sensing bulbs connected to said tubing, a liquid-vapor charge in said motor unit, one bulb of the outdoor thermostatic expansion valve being placed in thermal sensing relation to the refrigerant line of the outdoor coil considered the outlet during the heating cycle, and a second bulb of the outdoor thermostatic expansion valve being placed in thermal sensing relation to the refrigerant line to the indoor coil considered the inlet during the heating cycle; and a check valve connected across each of said thermostatic expansion valves, the check valve across the indoor thermostatic expansion valve permitting refrigerant flow to by-pass the said indoor thermostatic expansion valve only during the heating cycle, the check valve across the outdoor thermostatic expansion valve permitting refrigerant flow to by-pass the said outdoor thermostatic expansion valve only during the cooling cycle.

10. The combination and arrangement of elements as recited above in claim 9, but further characterized in that the said second bulb of the outdoor thermostatic expansion valve is placed in thermal sensing relation to the refrigerant line considered the inlet to the outdoor thermostatic valve during the heating cycle.

11. In a reversible cycle refrigeration system, an outdoor coil, an indoor coil, a liquid line connecting one side of the outdoor coil to one side of the indoor coil, a compressor having a discharge line and a suction line, switching means selectively connecting the discharge line to the other side of either of said coils and respectively connecting the suction line to the other side of the other said coil, an outdoor thermostatic expansion valve connected in the liquid line adjacent the outdoor coil, a motor unit for actuating said valve including tubing and a plurality of bulbs connected to said tubing, a liquid-vapor charge in said motor unit, one of said bulbs being placed in thermal sensing relation to the refrigerant line at the side of the outdoor coil opposite to the connection of the liquid line, and a second bulb placed in thermal sensing relation to a portion of the system that is cooler than the first bulb location during the cooling cycle and warmer than the first bulb location during the heating cycle.

12. The combination and arrangement of elements as recited above in claim 11, but further characterized in that the said second bulb is placed in thermal sensing relation to the refrigerant line at the side of the indoor coil opposite to the connection of the liquid line.

13. The combination and arrangement of elements as recited above in claim 11, but further characterized in that the said second bulb is placed in thermal sensing relation to the liquid line.

14. In a reversible cycle refrigeration system, an outdoor coil, an indoor coil, a liquid line connecting one side of the outdoor coil to one side of the indoor coil, a compressor having a discharge line and a suction line, switching means selectively connecting the discharge line to the other side of either of said coils and respectively connecting the suction line to the other side of the other said coil; an outdoor thermostatic expansion valve connected in the liquid line adjacent the outdoor coil, a motor unit for actuating said outdoor expansion valve including tubing and a plurality of bulbs connected to said tubing, a liquid-vapor charge in said motor unit, one of said bulbs being placed in thermal sensing relation to the refrigerant line at the side of the outdoor coil opposite to the connection of the liquid line, and a second bulb placed in thermal sensing relation to a portion of the system that is cooler than the first bulb location during the cooling cycle, and warmer than the first bulb location during the heating cycle; an indoor thermostatic expansion valve connected in the liquid line adjacent the indoor coil, a motor unit for actuating said indoor expansion valve including tubing and a bulb connected to said tubing, a limited-vapor charge in the motor unit of the indoor expansion valve, the bulb of the indoor expansion valve being placed in thermal sensing relation to the side of the indoor coil opposite to the connection of the liquid line.

15. The combination and arrangement of elements as recited above in claim 14, but further characterized by the provision of a check valve connected across each of said thermostatic expansion valves, the check valve across the outdoor expansion valve permitting refrigerant flow to by-pass the said outdoor expansion valve only during the cooling cycle, and the check valve across the indoor expansion valve permitting refrigerant flow to by-pass the said indoor expansion valve only during the heating cycle.

16. The combination and arrangement of elements as recited above in claim 15, but further characterized in that the said second bulb of the outdoor expansion valve is placed in thermal sensing relation to the refrigerant line at the side of the indoor coil opposite to the connection of the liquid line.

17. The combination and arrangement of elements as recited above in claim 15, but further characterized in that the said second bulb of the outdoor expansion valve is placed in thermal sensing relation to the liquid line.

References Cited in the file of this patent

UNITED STATES PATENTS

| 2,093,693 | Dillman | Sept. 21, 1937 |
| 2,495,228 | Berry | Jan. 24, 1950 |
| 2,624,181 | Erwin | Jan. 6, 1953 |